United States Patent
Hindle

(10) Patent No.: US 8,955,016 B2
(45) Date of Patent: Feb. 10, 2015

(54) METHOD AND SYSTEM FOR CUSTOMIZING METADATA IN TV NETWORK

(75) Inventor: James Matthew Hindle, London (CA)

(73) Assignee: TVWorks, LLC, Philadelphia, PA (US)

( * ) Notice: Subject to any disclaimer, the term of this patent is extended or adjusted under 35 U.S.C. 154(b) by 1913 days.

(21) Appl. No.: 12/035,868

(22) Filed: Feb. 22, 2008

(65) Prior Publication Data

US 2009/0217322 A1 Aug. 27, 2009

(51) Int. Cl.
*G06F 3/00* (2006.01)
*G06F 13/00* (2006.01)
*H04N 5/445* (2011.01)
*H04N 7/16* (2011.01)
*H04N 7/173* (2011.01)
*H04N 21/258* (2011.01)
*H04N 21/84* (2011.01)
*H04N 21/854* (2011.01)
*H04N 21/45* (2011.01)

(52) U.S. Cl.
CPC ............ *H04N 7/16* (2013.01); *H04N 7/173* (2013.01); *H04N 21/25891* (2013.01); *H04N 21/84* (2013.01); *H04N 21/854* (2013.01); *H04N 21/4532* (2013.01)
USPC ............ 725/47; 725/46; 725/39; 725/25

(58) Field of Classification Search
None
See application file for complete search history.

(56) References Cited

U.S. PATENT DOCUMENTS

| 7,047,253 | B1 | 5/2006 | Murthy et al. |
| 2003/0122966 | A1 | 7/2003 | Markman et al. |
| 2004/0175121 | A1* | 9/2004 | Ellis et al. ............ 386/83 |
| 2006/0004815 | A1 | 1/2006 | Murata et al. |
| 2006/0048181 | A1* | 3/2006 | Kim et al. ............ 725/37 |
| 2006/0271594 | A1 | 11/2006 | Haberman |
| 2008/0092168 | A1* | 4/2008 | Logan et al. ............ 725/44 |
| 2008/0222673 | A1* | 9/2008 | Durden et al. ............ 725/25 |
| 2009/0070817 | A1* | 3/2009 | Ellis et al. ............ 725/46 |

FOREIGN PATENT DOCUMENTS

| EP | 1147662 A1 | 10/2001 |
| WO | 02102079 | 12/2002 |

OTHER PUBLICATIONS

European Search Report for EP 09153370.3-1522 dated Apr. 29, 2009.

* cited by examiner

*Primary Examiner* — Nasser Goodarzi
*Assistant Examiner* — Fred Peng
(74) *Attorney, Agent, or Firm* — Banner & Witcoff, Ltd.

(57) ABSTRACT

A method for customizing metadata in a content delivery network, said method comprising: (a) storing customized metadata for a program, said customized metadata being inputted by a user; (b) modifying default metadata with said customized metadata and providing said modified metadata to said EPG; and (c) displaying program information based on said modified metadata.

19 Claims, 2 Drawing Sheets

METHOD AND SYSTEM FOR CUSTOMIZING METADATA IN TV NETWORK

FIELD OF INVENTION

The present invention relates generally to displaying information about a television program using an electronic program guide, and, more specifically, to displaying information that is customized by a user.

BACKGROUND OF INVENTION

Electronic program guides (EPG) are ubiquitous in television (TV) delivery systems or networks such as cable television and satellite television. Generally, an EPG displays information about a program that facilitates watching or recording the program, such as its title, broadcast time, and broadcast channel. An EPG allows the viewer to browse program summaries, and, in certain interactive networks, search by genre, title, or channel. Furthermore, when an EPG is connected to a digital video recorder (DVR), it enables a viewer to plan his or her viewing, and record programs for later viewing. An EPG may also be used to implement parental controls such that programs with certain ratings or titles are not permitted to be viewed without the appropriate password to override the parental control. The program information displayed by an EPG is based on the program's metadata.

Metadata for EPGs can be obtained in different ways including from the program's delivery stream, through metadata service providers, and from the recorded program. When a program is being delivered, it must have certain metadata information associated with it. Metadata transmitted along with the stream is referenced to herein as "content metadata." This is data transmitted along with the Digital TV (DTV) signal that lets DTV receivers extract information about the currently-tuned station and the current program. The data includes tuning information (frequency, MPEG program number), title, rating (for VCHIP/parental control purposes), closed captioning information, etc. This information is targeted for a short time frame (from current program up to 6 hours out) for the currently tuned digital transport stream only. It typically follows the Program and System Information Protocol (PSIP). This is not the type of information a traditional electronic program guide would use, but rather is used by an advanced digital TV without a set-top box (STB) or set-top unit. This data is accessed by the JavaTV (http://java.sun.com/products/javatv/) application programming interface (API) in the javax.tv.service.guide package. Other standards for injecting metadata in a delivery stream are ATSC (American TV Standards Committee), which is an older more generic standard, and OCAP (Open Cable Application Platform), which is a Java API for making metadata available from a content entity (e.g., ABC, PBS, etc) to any java application running on device.

Another source of metadata is through "metadata aggregators" and is referred to herein as "aggregated metadata." This is not governed by a standard, but rather is provided for a fee to populate an EPG. This data includes all the typical data one would expect to see (title, rating, content warnings, description, actors, director(s), review, duration, audio info (language, stereo, Dolby, Dolby 5.1, etc.), video info (letterbox, wide screen, HD, etc.), category, subcategories). The two major program metadata aggregators in the North American market are Tribune Media Services (TMS), which provides both PSIP and proprietary program listing formats, and Gemstar TVGuide, which provides a proprietary program listing format for use in their guides.

A third source of metadata is through the content recorded by a DVR, and is referred to herein as "recorded metadata". Recorded metadata is stored when a program is recorded on a user's DVR. Although this information will include the broadcast and/or aggregated metadata as mentioned above, it will also include other information as to the time of recording and whether or not the show has been watched by the user. Generally, this metadata is stored with the recorded content on the user's DVR.

Displaying program information on the user's TV requires obtaining, organizing, and providing the above-described metadata to the EPG. TVWorks (Ontario, Canada) provides a state-of-the-art solution for providing metadata to the EPG. Specifically, the solution involves a server associated with the cable provider or multi system operator (MSO) and a software module associated with the user's STB. The server accesses metadata aggregators such as TVGuide and TMS to obtain metadata information on publicly-delivered content. This server also functions to filter this metadata such that only regionally appropriate subject matter, that is, programming specific to the regional area supported by the MSO headend is provided to the signal provider. In the TVWorks environment, this data is imported from either TMS or TVGuide and converted into a proprietary database format.

In addition to the server, the TVWorks system also comprises a module on the user's STB that serves to gather and provide metadata information to the EPG. Specifically, the module comprises a set of Java APIs that an electronic program guide (or any other OCAP application) can use to query or search form program data up to two weeks beyond the current time on any channel, regardless of what channel the user might be tuned to at that moment. This way, the TVWorks system aggregates the various metadata sources, and provides the EPG with a single point to obtain the needed metadata.

Although TVWorks' approach is effective in supporting the EPG, Applicants have nevertheless identified a need for improving the quality of the metadata provided. The present invention fulfills this need among others.

SUMMARY OF INVENTION

Applicants have recognized that information displayed by an EPG is not as useful as it could be because only information based on "default metadata" is displayed. As used herein, the term "default metadata" refers to content metadata, aggregated metadata and recorded metadata as described above.

Default metadata is deficient in several ways. First, often it provides insufficient information to adequately describe the program. For example, certain programs may be entitled as "unlisted." Likewise, often series are entitled by just the name of the series with no specificity given to the particular episode in question. For example, the metadata information for an episode of the Sopranos may simply say "Sopranos" and not provide additional information of that particular episode. Conversely, often situations arise when the default metadata provides too much information. Such a case may arise, for example, with respect to adult content or other programming that a user may want to conceal from other members of his household. Yet another shortcoming of default metadata is with respect to parental controls. Parental controls typically involve a prohibition of certain titles and ratings, meaning that programs having the "locked" titles or ratings cannot be viewed without a password. However, a parent may deem a program suitable for viewing after reviewing the program, or otherwise reevaluating it, and wish to override a locked title or rating. In this case, it would be helpful if additional information could be provided to override the parental control. Therefore, Applicants have identified a need to augment or otherwise modify the default metadata to enhance or obscure the description, or to facilitate more flexibility in the parental controls.

Applicants not only have identified the need for modifying default metadata, but also provide a solution. Specifically, the system of the present invention provides an additional source of metadata, which is customized for a particular user for a particular program. This customized metadata changes, augments or otherwise modifies the default metadata described above. Such customized metadata allows the default metadata to be modified automatically and updated appropriately such that the EPG is provided with more meaningful metadata.

One aspect of the invention is a set-top box (STB) for providing default metadata modified with customized metadata to an EPG. In one embodiment, the STB comprises: (a) an interface with a signal provider to convert information transmitted therefrom for display on a monitor; (b) an interface to a customized metadata database containing customized metadata; (c) an electronic program guide for displaying information about a program; and (d) a metadata module for obtaining default metadata for a program and modifying the default metadata with the customized metadata contained in the customized metadata database, and providing the modified metadata to the electronic program guide, which displays information about the program on the monitor.

Another aspect of the present invention is a method for modifying default metadata to display information that is more meaningful to a particular user. In a preferred embodiment, the method comprises (a) displaying information about a program with an EPG based on default metadata; (b) storing customized metadata for the program, the customized metadata being inputted by a user; (c) modifying the default metadata with the customized metadata and providing the modified metadata to the EPG; and (d) displaying modified program information with the EPG based on the modified metadata.

Yet another aspect of the invention is a TV network for modifying default metadata. In a preferred embodiment, the system comprises a signal provider operatively connected to a server, which obtains aggregated metadata, a content entity, which transmits content metadata, and at least one STB comprising (a) an interface with the signal provider to convert information transmitted therefrom for display on a monitor; (b) an interface to a customized metadata database containing customized metadata; (c) an electronic program guide for displaying information about a program; and (d) a metadata module for obtaining default metadata for a program and modifying the default metadata with the customized metadata contained in the customized metadata database, and providing modified metadata to the electronic program guide.

DETAILED DESCRIPTION

Figure 1:
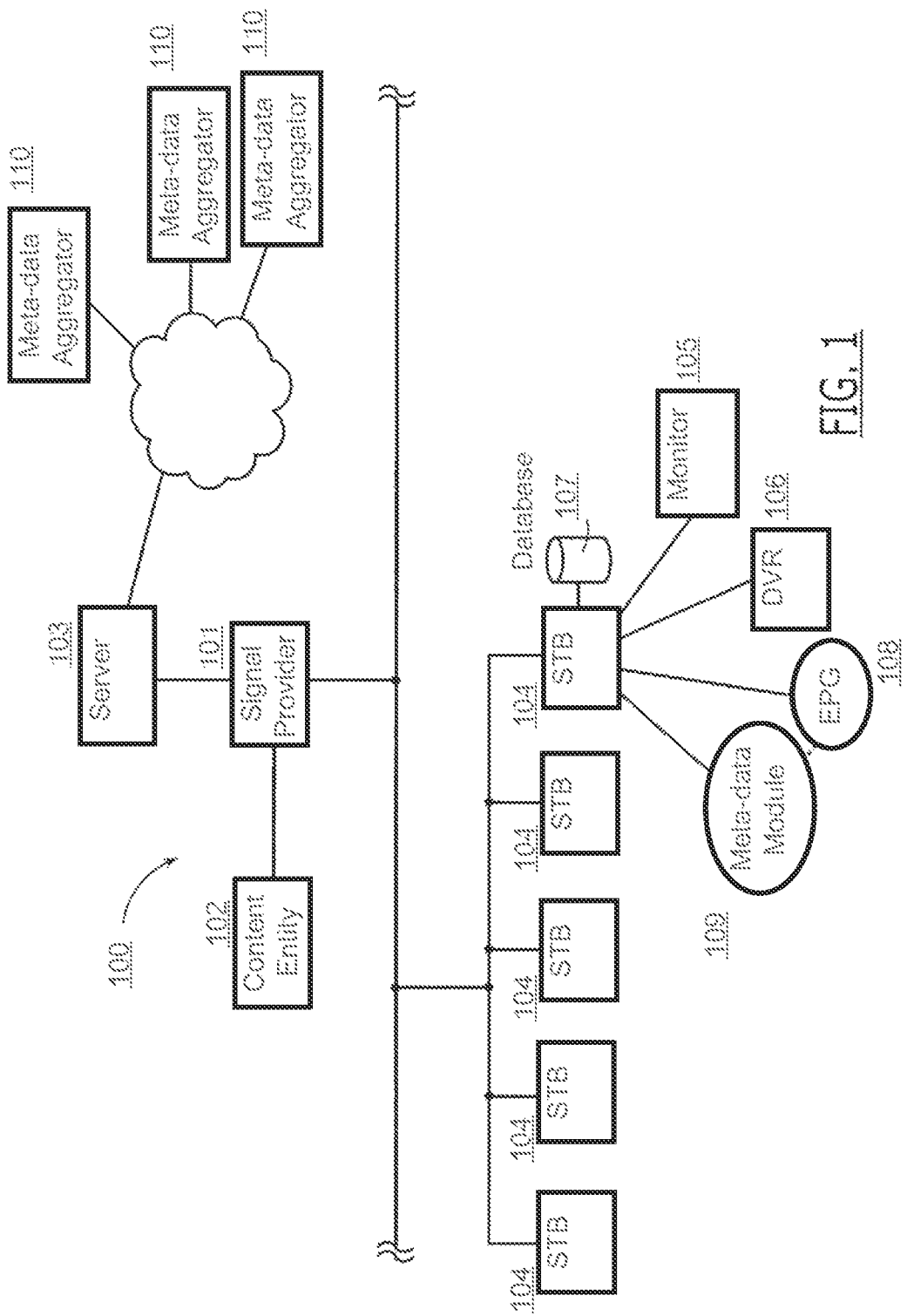
FIG. 1 is a schematic of a preferred embodiment of the system of the present invention.

Referring to FIG. 1, a system 100 of the present invention is shown. The system 100 comprises a signal provider 101 such as a cable facility head end of a multisystem operator (MSO). The signal provider 101 is operatively connected to a content entity 102, for example, ABC, NBC, etc., a metadata server 103, and at least one subscriber set-top box (STB) 104. The server 103 is in communication with metadata aggregators 110, such as TV Guide and TMS. The signal provider 101 is configured to stream content from the content entity 102 to the STBs 104. The subscriber STB is operatively connected to a television or other type of monitor 105, optionally a digital video recorder (DVR) 106 having digital storage for storing delivered content from the signal provider 101, and a customized metadata database 107 containing customized metadata. The STB 104 also comprises an electronic program guide (EPG) 108 to display information about a program on the monitor 105 based on metadata, and a module 109 supporting the EPG by obtaining default metadata for a given program and modifying the default data according to the customized metadata. Although a cable system is considered herein in detail, it should be understood that this is just for illustrative purposes, and the invention is not limited to a cable network and can be applied in any content delivery system or network.

Figure 2:
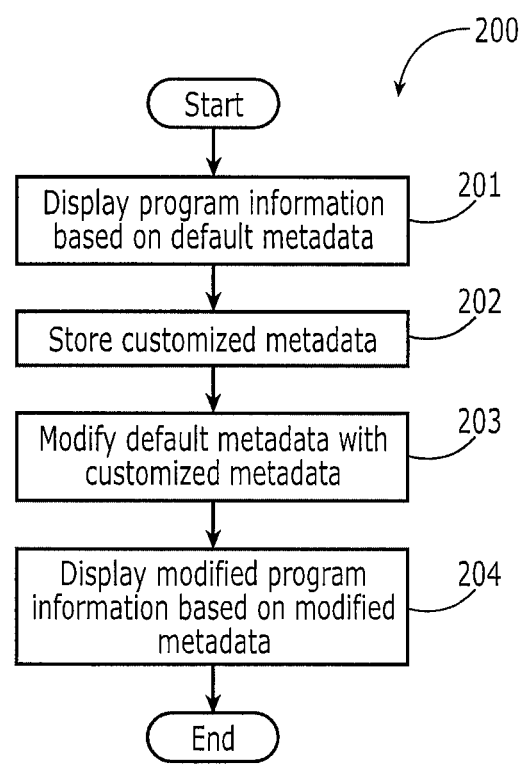
FIG. 2 is a flow chart of a preferred method of the present invention.

The system 100 functions to perform method 200 depicted in a flow chart in FIG. 2. Specifically, in step 201, information about a program is displayed on a monitor 105 by the EPG 108 based on default metadata. Such a step occurs when the program information is initially displayed, before a user has had an opportunity to add customized metadata. As is known in the prior art, the default metadata may be obtained from various sources including the delivery stream, metadata provider, or stored metadata. After the program information is displayed, the user may input customized metadata for the program, which is stored in the customized metadata database 107 in step 202. In step 203, the module 109 obtains the default metadata for a program, modifies it according to the customized metadata, and provides the modified metadata to the EPG 108 for display on the monitor. As used herein, the term "modified" means changed or augmented. In step 204, the EPG displays modified program information based on the modified metadata provided by the metadata module 109. The system 100 and method 200 are described in greater detail below.

As mentioned above, Step 201, displaying information about a program using an EPG is essentially the same as in the prior art and will not be discussed further. In Step 202, the user enters customized metadata. There may be various reasons for doing so. Generally, the customized data modifies the default metadata, e.g., either clarifies the program's content or obscures it. For example, a user may wish to entitle an episode of a series by the subject matter of that particular episode, rather than by the series name. For example, rather than simply calling a recorded program "Seinfeld" or "NFL Football," a user may rename the programs to read "Seinfeld—Series Finale" or "Steelers v. Eagles," respectively. Likewise, often default metadata may not include the title of a program, which is scheduled for broadcast far into the future or on an obscure channel (e.g., "to be announced"). In such a case, additional information with respect to the title may be inputted. Furthermore, when multiple shows are recorded in a block of time, the recorded block may be entitled to be meaningful, e.g., "Must See TV 6/24/06." It also might be convenient to translate names into different languages, e.g., "Friends" may be renamed "Amigos."

In contrast to adding information to clarify the content of a program, it may be preferable in certain circumstances to obscure the data. For example, often adult content may contain descriptions that are too explicit for general household viewing. In such cases, the present invention allows the user to modify the title or other parameter to obscure what otherwise might be an overly-descriptive title. Other reasons for obscuring data will be obvious to one of skill in the art in light of this disclosure.

In addition to modifying the title of the show, it may be preferable to modify its rating or otherwise override a parental control. Specifically, if a parental control is used to lock out a certain title or rating, but the parent, after viewing it, finds the subject matter to be suitable for household viewing, the parent may alter the rating or title such that it avoids the parental control lock. Likewise, information can be added to rate the quality of a program or otherwise categorize it personally. For example, the user may want to rate different episodes of a series or characterize different programs for cataloging purposes (e.g., boring, the best, good for kids). In addition to these modifications, others will be obvious to one of skill in the art in light of this disclosure.

Referring back to system 100 of FIG. 1, the STB 104 is configured to interface with the monitor 105, the signal provider 101, the customized metadata database 107, and optionally the DVR 106. As used herein, a STB is a device that connects to a monitor and an external source of signal, converting the signal into content for display on the monitor. The signal source might be an ethernet cable, a satellite dish, a coaxial cable (cable television), a telephone line (including DSL connections), Broadband over Power Line, or even an ordinary VHF or UHF antenna. Content, in this context, could mean any or all of video, audio, Internet webpages, interactive games, or other possibilities.

The STB may have several different embodiments. For example, it may be a special digital STB for delivering digital content on TV sets that do not have a built in digital tuner. The STB may also descramble premium cable channels. A STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In IPTV networks, the STB is a small computer providing two-way communications on an IP network, and decoding the video streaming media which eliminates the need for any coaxial cabling.

The STB may be a discrete unit or its functionality may be distributed to other components of the user's system such as the monitor, TV, DVR, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television (or DVR).

Some boxes may have a built-in DVR that often utilizes the electronic program guide scheduling data and records content to a memory device, e.g., an internal hard disk drive. As used herein, a DVR is a device that records video content in a digital format to a memory device such a disk drive or static memory. The device may be a portable, modular unit (i.e., a personal DVR) or it may be integrated into a stationary TV system. The term includes stand-alone units and software for a personal computer that enables video capture and playback to and from the computer's memory. The term also includes televisions with DVR hardware and software built in to the television itself.

The customized metadata database 107 may be integrated or discrete from the STB. Preferably, it is integrated with the DVR's digital storage to simplify the system. Information is entered into the customized metadata database by the user, and preferably through the user input device associated with the STB such as a remote control. In this respect, inputting customized metadata may be performed by displaying a pop-up virtual keyboard on the monitor and selecting keys therefrom using the remote control.

In the present system, the STB is configured with the EPG 108 and the metadata module 109. The EPG, sometimes referred to as an Interactive Program Guide (IPG) or an Electronic Service Guide (ESG)) is a well known type of software application for providing an on-screen guide to scheduled broadcast television programs, allowing a viewer to navigate, select, and discover content by time, title, channel, genre, etc, by use of their remote control, a keyboard or even a phone keypad. The technology is based upon delivering data to an application usually residing within middleware in the STB that connects to the television set and enables the display of the metadata related to the content. Newer media centers (i.e., PC based multi-channel TV recorders) and DVRs may use an internet feed for the EPG. This enables two-way interactivity for the user so that media delivery can be requested via the EPG, or related link, and remote programming of the media centre can be achieved. Typical elements of an EPG include a graphical user interface which enable the display of program titles, descriptive information such as a synopsis, actors, directors, year of production, and so on, the channel name and the programs offered from subchannels such as pay-per-view and video-on-demand (VOD) services, program start times, genres and other descriptive metadata. The information is typically displayed on a grid with the option to select more information on each program.

The EPG 108 is supported by the metadata module 109. The term "module" is used broadly herein and refers generally to a program resident in memory of a computer. It should be understood that the metadata module and the EPG may be one in the same program or they may be discreet programs run discreetly on a user's STB or on different components. The metadata module 109 is configured to obtain the default metadata as described above and then modify it with the customized metadata stored in the customized database. The following is pseudocode for carrying out this function:

```
ProgramElement program = getProgram(channel, time);
String title = program.getTitle( );
Rating rating = program.getRating( );
// Display some screen that presents, title, rating, and other fields.
EditScreen screen = new EditScreen(title, rating, ...);
// If user modifies any of the values on the screen and selects a
'save' function
   screen.display( );
// blocks here until dismissed by the user
if (screen.getTitle( ) != title)
   program.setUserTitle(screen.getTitle( ));
if (screen.getRating( ) != rating)
   program.setUserRating(screen.getRating( ));
// etc. repeat for other fields that the user may edit
program.saveUserOverrides( );
```

The systems and processes described above are shown only by way of example and are not meant to limiting in any manner. It would be obvious to one of ordinary skill in the art to add, remove or combine components or steps as needed for any individual situation. The invention is only intended to be limited by the claims that follow.

What is claimed is:

1. A method comprising:
receiving a program and default metadata, wherein information about the program is displayed in an electronic program guide based on the default metadata;

replacing the default metadata with customized metadata inputted by a user;

receiving a password before replacing the default metadata with said customized metadata; and displaying the electronic program guide with changed program information based on said customized metadata.

2. The method of claim 1, wherein said customized metadata is stored in a customized metadata database.

3. The method of claim 1, wherein said default metadata comprises at least one of content metadata, aggregated metadata, and stored metadata.

4. The method of claim 1, wherein said default metadata is modified to obscure an identification of said program.

5. The method of claim 4, wherein a title of the program is changed to conceal adult content.

6. The method of claim 1, wherein said default metadata is modified to clarify a description of said program.

7. The method of claim 6, wherein said default metadata is modified to change a name of the program from a series name to a name specific to an episode.

8. The method of claim 1, wherein said default metadata is replaced with the customized metadata to correct a mistake.

9. The method of claim 1, wherein said customized metadata fills in incomplete information in said default metadata.

10. The method of claim 1, wherein said default metadata is a program rating.

11. The method of claim 1, wherein the replacing of the default metadata with said customized metadata overrides a parental control which is based on the default metadata.

12. A computer comprising one or more digital processors and memory storing software, that when executed by the one or more processors, causes the computer to:

receive a program and default metadata, wherein information about the program is displayed in an electronic program guide based on the default metadata;

replace said default metadata with customized metadata inputted by a user;

receive a password before replacing the default metadata with said customized metadata; and output said electronic program guide to a display with changed program information based on said customized metadata.

13. The computer of claim 12, further comprising:

an interface to a digital video recorder (DVR) having digital storage for storing the program and the default metadata.

14. The computer of claim 13, further comprising the digital video recorder (DVR).

15. The computer of claim 14, further comprising a database which stores the customized metadata, wherein said DVR and said database are integrated into a common component.

16. The computer of claim 13, wherein said default metadata includes content metadata from a content signal of a content entity, aggregated metadata from an aggregator, and recorded metadata from said DVR.

17. A system comprising:

a signal provider configured to provide content and default metadata to one or more computers; and the one or more computers, each comprising one or more digital processors and memory storing software, that when executed by the one or more processors, causes each of the one or more computers to:

receive the content and the default metadata, wherein information about the content is displayed in an electronic program guide based on the default metadata;

replace said default metadata with customized metadata inputted by a user;

receive a password before replacing the default metadata with said customized metadata; and output said electronic program guide for display with changed program information based on said customized metadata.

18. A non-transitory computer readable memory storing software, that when executed by a processor, causes the processor to:

receive a program and default metadata, wherein information about the program is displayed in an electronic program guide based on the default metadata;

replace the default metadata with customized metadata inputted by a user; and display the electronic program guide with changed program information based on the customized metadata, wherein the replacing of the default metadata with said customized data overrides a parental control which is based on the default metadata.

19. A method comprising:

receiving a program and default metadata, wherein information about the program is displayed in an electronic program guide based on the default metadata;

replacing the default metadata with customized metadata inputted by a user; and displaying the electronic program guide with changed program information based on the customized metadata, wherein the replacing of the default metadata with said customized metadata overrides a parental control which is based on the default metadata.

* * * * *